(12) United States Patent
Sung et al.

(10) Patent No.: US 11,080,571 B2
(45) Date of Patent: Aug. 3, 2021

(54) OUTPUTTING PLURALITY OF IMAGES HAVING DIFFERENT SIZES

(71) Applicant: Hewlett-Packard Development Company, L.P., Spring, TX (US)

(72) Inventors: In Soo Sung, Suwon-si (KR); Chang Min Han, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/477,719

(22) PCT Filed: Jan. 15, 2018

(86) PCT No.: PCT/KR2018/000657
§ 371 (c)(1),
(2) Date: Jul. 12, 2019

(87) PCT Pub. No.: WO2018/131958
PCT Pub. Date: Jul. 19, 2018

(65) Prior Publication Data
US 2019/0362203 A1    Nov. 28, 2019

(30) Foreign Application Priority Data

Jan. 16, 2017  (KR) .......................... 10-2017-0007030

(51) Int. Cl.
*G06K 15/02*    (2006.01)
*G06K 15/00*    (2006.01)

(52) U.S. Cl.
CPC ........ *G06K 15/1823* (2013.01); *G06K 15/002* (2013.01); *G06K 15/1809* (2013.01); *G06K 15/1894* (2013.01)

(58) Field of Classification Search
None
See application file for complete search history.

(56) References Cited

U.S. PATENT DOCUMENTS

| | | | |
|---|---|---|---|
| 6,041,205 A | 3/2000 | Funada et al. | |
| 6,930,796 B1* | 8/2005 | Matsuura | G03G 15/5095 358/1.1 |
| 9,116,648 B1 | 8/2015 | Funderburg et al. | |
| 9,224,078 B2 | 12/2015 | Sawada | |
| 2005/0140991 A1 | 6/2005 | Ogiwara et al. | |
| 2006/0119891 A1 | 6/2006 | Shimizu | |
| 2007/0279673 A1* | 12/2007 | Utsunomiya | G06K 15/021 358/1.14 |
| 2009/0265625 A1* | 10/2009 | Tamai | H04N 1/00408 715/274 |
| 2014/0022609 A1 | 1/2014 | Tanigawa et al. | |

(Continued)

FOREIGN PATENT DOCUMENTS

| | | |
|---|---|---|
| CN | 1716324 A | 1/2006 |
| CN | 1818982 A | 8/2006 |

(Continued)

*Primary Examiner* — Frantz Bataille
(74) *Attorney, Agent, or Firm* — Jefferson IP Law, LLP (57) ABSTRACT

Provided are an image forming apparatus for outputting a plurality of images having different sizes according to a method pre-set by a user without interrupting a current printing operation when the plurality of images having different sizes are obtained and a method of operating the image forming apparatus.

15 Claims, 8 Drawing Sheets

(56) References Cited

U.S. PATENT DOCUMENTS

| | | | |
|---|---|---|---|
| 2014/0184848 A1* | 7/2014 | Shimosato | H04N 5/232939 348/223.1 |
| 2014/0368839 A1* | 12/2014 | Xia | G06K 15/1814 358/1.2 |
| 2015/0002572 A1 | 1/2015 | Maeda | |
| 2015/0055154 A1* | 2/2015 | Hasegawa | H04N 1/04 358/1.9 |
| 2016/0231966 A1 | 8/2016 | Ujike | |

FOREIGN PATENT DOCUMENTS

| | | | |
|---|---|---|---|
| CN | 104238964 A | 12/2014 | |
| CN | 106126133 A | 11/2016 | |
| JP | 08179906 A | 7/1996 | |
| JP | 2002067426 A | 3/2002 | |
| JP | 2002137484 A | 5/2002 | |
| JP | 2012093535 A | 5/2012 | |
| JP | 2015092786 A | 5/2015 | |
| KR | 102003004833 A | 6/2003 | |

\* cited by examiner

| | | 900 |
|---|---|---|
| ☰ SETTING | | 🔍 ★ |
| | OUTPUT MODE SETTING ▶ MIXED OUTPUT | |
| ADMINISTRATOR SETTING | ● MIXED OUTPUT (DEFAULT) | |
| Xxxx SETTING | ○ BATCH OUTPUT (FOR LARGE PAPER) | |
| Xxxx SETTING | ○ BATCH OUTPUT (FOR STANDARD PAPER) | |
| OUTPUT MODE SETTING | ○ BATCH OUTPUT (FOR SELECTED PAPER) [📄 ▼] | |
| | ○ ALTERNATIVE OUTPUT (FOR LARGE PAPER WHEN THERE IS NO MATCHING PAPER) | |
| | ○ ALTERNATIVE OUTPUT (FOR SMALL PAPER WHEN THERE IS NO MATCHING PAPER) | |
| | ○ ALTERNATIVE OUTPUT (FOR LARGE/SMALL PAPER WHEN THERE IS NO MATCHING PAPER) | |
| | ○ OUTPUT AFTER USER CONFIRMATION | |

[Fig. 10]

| | 1000 |
|---|---|
| SELECT OUTPUT METHOD | |
| SIZE OF RECEIVED IMAGES | ● MIXED OUTPUT (A4,B5,A3) |
| 📄 A4:1PAGE | ○ BATCH OUTPUT – FOR LARGE PAPER (A3) |
| 📄 B4:5PAGE | ○ BATCH OUTPUT – FOR STANDARD PAPER (A4) |
| 📄 A3:10PAGE | ○ BATCH OUTPUT – FOR SELECTED PAPER |
| | ○ ALTERNATIVE OUTPUT (FOR LARGE PAPER WHEN THERE IS NO MATCHING PAPER) |
| | ○ ALTERNATIVE OUTPUT (FOR SMALL PAPER WHEN THERE IS NO MATCHING PAPER) |
| | ○ ALTERNATIVE OUTPUT (FOR LARGE/SMALL PAPER WHEN THERE IS NO MATCHING PAPER) |
| | DESCRIPTION : MIXEDLY PRINTING ON A4, B5, AND A3 PAPER |
| CONFIRM | |

[Fig. 11]

| BATCH OUTPUT – FOR SELECTED PAPER ||
|---|---|
| SIZE OF RECEIVED IMAGES | PAPER SIZE |
| A4:1PAGE <br> B4:5PAGE <br> A3:10PAGE | PAPER TRAY 1 ● A4 <br> PAPER TRAY 2 ○ B4 <br> PAPER TRAY 3 ○ A3 (EMPTY) <br> PAPER TRAY 4 ○ A4 (EMPTY) |
| CONFIRM ||

[Fig. 12]

| ALTERNATIVE OUTPUT <br> (FOR SMALL PAPER WHEN THERE IS NO MATCHING PAPER) ||
|---|---|
| SIZE OF RECEIVED IMAGES | PAPER SIZE |
| A4:1PAGE <br> B4:5PAGE <br> A3:10PAGE | PAPER TRAY 1 ● A4 <br> PAPER TRAY 2 ● B4 <br> PAPER TRAY 3 ○ A3 (EMPTY) |
|  | SINCE THERE IS NO A3 PAPER, A3 IMAGE WILL BE OUTPUT ON A4 PAPER |
| CONFIRM ||

OUTPUTTING PLURALITY OF IMAGES HAVING DIFFERENT SIZES

BACKGROUND ART

An image forming apparatus may obtain a plurality of images having different sizes from an external apparatus. When an image having a size coinciding with one of different sizes of paper provided at an image forming apparatus is received, the image forming apparatus may immediately print the image. However, when an image having a size that does not match any of the different sizes of the paper provided at the image forming apparatus is received, the image forming apparatus needs to stop a printing operation. To resume the printing operation, it is necessary for a user to supply paper matching the size of the image to the image forming apparatus.

DISCLOSURE OF INVENTION

Brief Description of Drawings

These and/or other aspects will become apparent and more readily appreciated from the following description of the examples, taken in conjunction with the accompanying drawings in which.

MODE FOR THE INVENTION

Reference will now be made to examples, which are illustrated in the accompanying drawings. In this regard, the examples may have different forms and should not be construed as being limited to the descriptions set forth herein. In order to further clearly describe features of the examples, descriptions of other features that are well known to one of ordinary skill in the art are omitted here.

In the specification, when an element is "connected" to another element, the elements may not only be "directly connected", but may also be "electrically connected" via another element therebetween. Also, when a region "includes" an element, the region may further include another element instead of excluding the other element, unless otherwise differently stated.

In the specification, an "image forming job" may denote any one of various jobs (for example, printing, copying, scanning, and faxing) related to an image, such as forming of an image or generating/storing/transmitting of an image file, and a "job" may denote not only an image forming job, but may also denote a series of processes required to perform the image forming job.

Also, an "image forming apparatus" may denote any apparatus capable of performing an image forming job, such as a printer, a scanner, a fax machine, a multi-function printer (MFP), or a display apparatus.

Also, "print data" may denote data having a format printable by a printer.

Also, a "scan file" may denote a file generated by scanning an image by using a scanner.

Also, a "user" may denote a person who performs manipulation related to an image forming job by using an image forming apparatus or a device connected to the image forming apparatus wirelessly or via wires.

Hereinafter, the present disclosure will be described with reference to the accompanying drawings.

Figure 1:
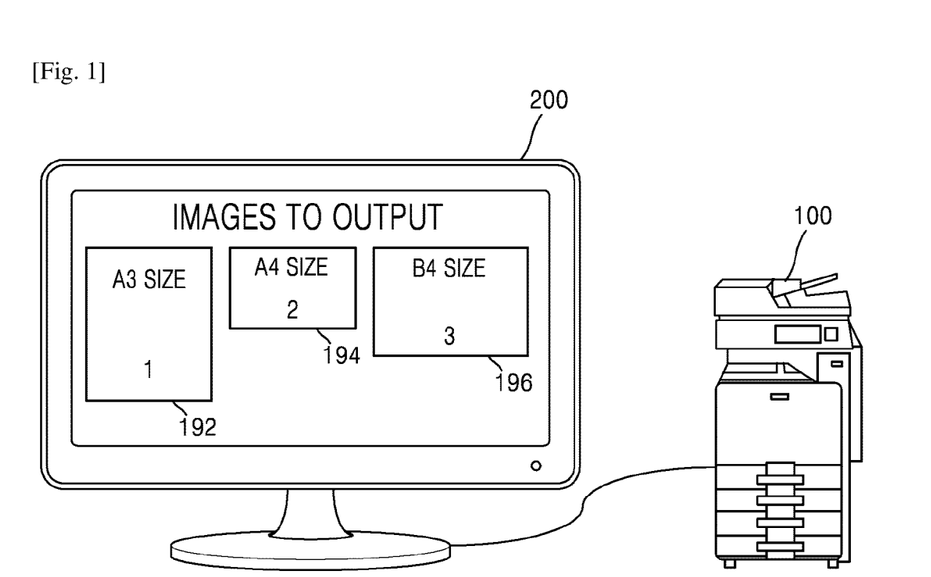
FIG. 1 is a diagram illustrating an example in which an image forming apparatus according to an example outputs a plurality of images having different sizes.

FIG. 1 is a diagram illustrating an example in which an image forming apparatus according to an example outputs a plurality of images having different sizes.

As shown in FIG. 1, an external apparatus 200 may transmit any or all of a plurality of images 192, 194, and 196, respectively having different sizes A3, A4, and B4, to an image forming apparatus 100. The external apparatus 200 may include, but is not limited to, an electronic device, such as a smart phone, a tablet, a personal computer (PC), a home appliance, a medical device, a camera, and a wearable device.

According to an example, when A3 size paper is not provided in the image forming apparatus 100, the image forming apparatus 100 is unable to print an A3 size image 192 on A3 size paper. At this time, the image forming apparatus 100 may be set to print the A3 size image 192 on paper of a different size provided in a paper tray of the image forming apparatus 100 instead of A3 size paper. Alternatively, the image forming apparatus 100 may be set to print the A3 size image 192 on paper of a size of one of the plurality of images 194 and 196 having a size other than A3.

According to examples of the present disclosure, even when paper corresponding to a size of an image to print is not present in a paper tray, a printing job may continue without interruption by using paper of another size existing in a paper tray.

In an example, the plurality of images 192, 194, and 196 having different sizes and transmitted from the external apparatus 200 to the image forming apparatus 100 to be printed in FIG. 1 may be images included in one image forming job.

Figure 2:
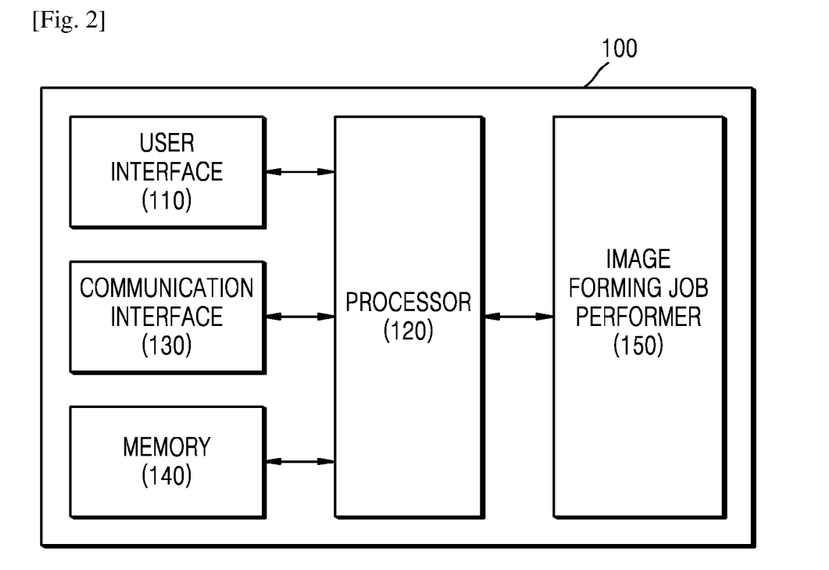
FIG. 2 is a block diagram of an image forming apparatus according to an example.

FIG. 2 is a block diagram of an image forming apparatus, such as image forming apparatus 100, according to an example.

Referring to FIG. 2, the image forming apparatus 100 according to an example may include a user interface 110, a processor 120, a communication interface 130, a memory 140, and an image forming job performer 150. Also, although not illustrated in FIG. 2, the image forming apparatus 100 may further include a power supplier for supplying power to each component of the image forming apparatus 100.

The user interface 110 may include an input unit for receiving, from a user, an input for performing an image forming job, and an output unit for displaying information, such as a result of performing an image forming job or a state of the image forming apparatus 100. For example, the user interface 110 may include an operation panel for receiving a user input and a display panel for displaying a screen.

As an example, the input unit may include at least one of devices for receiving various types of user inputs, such as a keyboard, a physical button, a touch screen, a camera, or a microphone. Also, the output unit may include, for example, a display panel or a speaker. However, an example is not limited thereto, and the user interface 110 may include at least one device supporting various inputs and outputs.

The processor 120 controls overall operations of the image forming apparatus 100, and may include a processor, such as a central processing unit (CPU). The processor 120 may control other components included in the image forming apparatus 100 such that an operation corresponding to a user input received through the user interface 110 is performed.

For example, the processor 120 may execute a program stored in the memory 140, read a file stored in the memory 140, or store a new file in the memory 140.

The processor 120 according to an example may detect respective sizes of a plurality of images obtained by the image forming apparatus 100. Furthermore, the processor 120 may determine whether the respective sizes of the plurality of images are identical to one another and, in response to a determination that the respective sizes of the plurality of images are not identical to one another, may set respective sizes of the plurality of images based on a pre-set output mode. A description of example operations performed by the processor 120 will be given below with reference to FIG. 6.

The communication interface 130 may communicate with another device or a network in a wired or wireless manner. Accordingly, the communication interface 130 may include a communication module supporting at least one of various wired and wireless communication methods. For example, the communication module may be in a form of a chipset or may be a sticker or a barcode (for example, a sticker including a near field communication (NFC) tag) including information required for communication.

Wireless communication may include, for example, at least one of wireless fidelity (Wi-Fi), Wi-Fi direct, Bluetooth, ultra wideband (UWB), and NFC. Wired communication may include, for example, at least one of universal serial bus (USB) and high definition multimedia interface (HDMI). Furthermore, the communication interface 130 may perform a communication with other devices or networks via a wire or wirelessly by using a simple network management protocol (SNMP), a hyper text transfer protocol (HTTP), etc.

The communication interface 130 according to an example may obtain a plurality of images from an outside source (i.e., a source external to the image forming apparatus 100).

Figure 3:
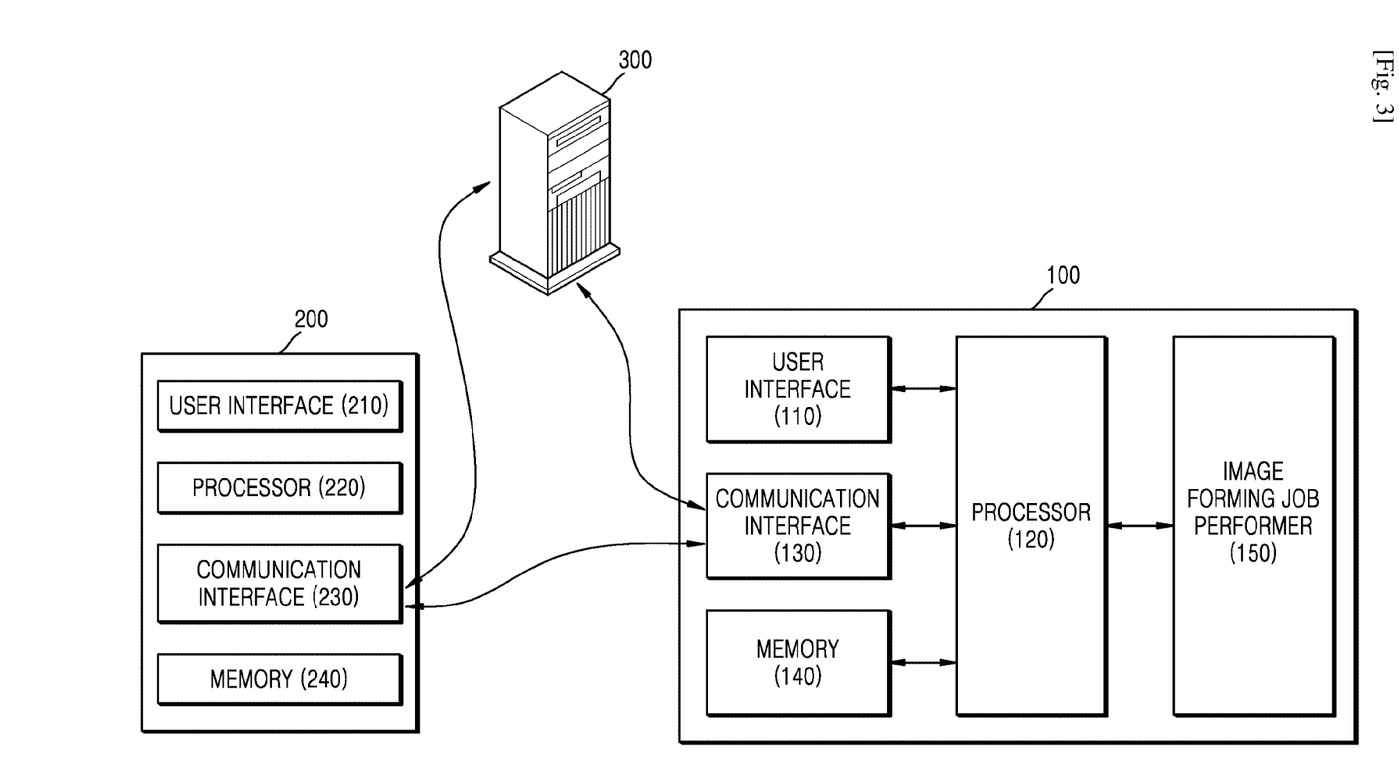
FIG. 3 is a block diagram illustrating a relationship between an image forming apparatus an external apparatus, and a server according to an example.

The communication interface 130 may be connected to an external apparatus located outside the image forming apparatus 100 and transmit/receive signals or data. As illustrated in FIG. 3, the image forming apparatus 100 is connected to an external apparatus 200 via the communication interface 130. The communication interface 130 may transmit signals or data received from the external apparatus 200 to the processor 120 or may transmit signals or data generated by the processor 120 to the external apparatus 200. For example, when the communication interface 130 receives a print command signal and print data from the external apparatus 200, the processor 120 may output the received print data via the image forming job performer 150.

The various types of data, such as a file or a program like an application, may be installed and stored in the memory 140. The processor 120 may access the data stored in the memory 140 to use the data, or may store new data in the memory 140. Also, the processor 120 may execute the program installed in the memory 140. Also, the processor 120 may install an application received from an external source through the communication interface 130 in the memory 140.

The image forming job performer 150 may perform an image forming job, such as printing, scanning, or faxing.

According to an example, the image forming job performer 150 may perform an outputting operation based on respective sizes of the plurality of images set by the processor 120.

FIG. 3 is a block diagram illustrating a relationship among an image forming apparatus, an external apparatus, and a server according to an example.

Referring to FIG. 3, the external apparatus 200 may include a user interface 210, a processor 220, a communication interface 230, and a memory 240. The processor 220 may control an image forming job by executing a program stored in the memory 240 and transmitting a signal or data generated as a result of executing the program to the image forming apparatus 100 through the communication interface 230.

In an example, the communication interface 130 may be connected to a server 300 and transmit/receive signals or data. Furthermore, the communication interface 130 may be connected to the external apparatus 200 via the server 300. In other words, the communication interface 130 of the image forming apparatus 100 may transmit/receive signals or data to/from the communication interface 230 of the external apparatus 200 via the server 300.

For example, the communication interface 130 may obtain a plurality of images from the external apparatus 200 or the server 300. The plurality of images may be a plurality of images included within a single image forming job.

Figure 4:
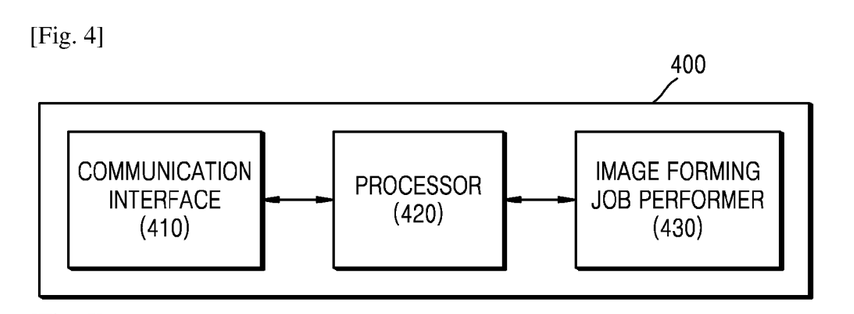
FIG. 4 is a block diagram illustrating a configuration of an image forming apparatus according to another example.

FIG. 4 is a block diagram illustrating a configuration of an image forming apparatus according to another example.

Referring to FIG. 4, an image forming apparatus 400 according to an example may include a communication interface 410, a processor 420, and an image forming job performer 430. The communication interface 410 may perform operations similar to those performed by the communication interface 130 of FIG. 2. Also, the processor 420 may perform operations similar to those performed by the processor 120 of FIG. 2, and the image forming job performer 430 may perform operations similar to those performed by the image forming job performer 150 of FIG. 2.

According to an example, the communication interface 410 may obtain a plurality of images.

According to an example, the processor 420 may detect respective sizes of the plurality of images.

According to an example, in response to a determination that the respective sizes of the plurality of images are not identical to one another, the processor 420 may set respective sizes of the plurality of images based on a pre-set output mode.

According to an example, the image forming job performer 430 may perform an outputting operation based on the respective set sizes of the plurality of images.

Figure 5:
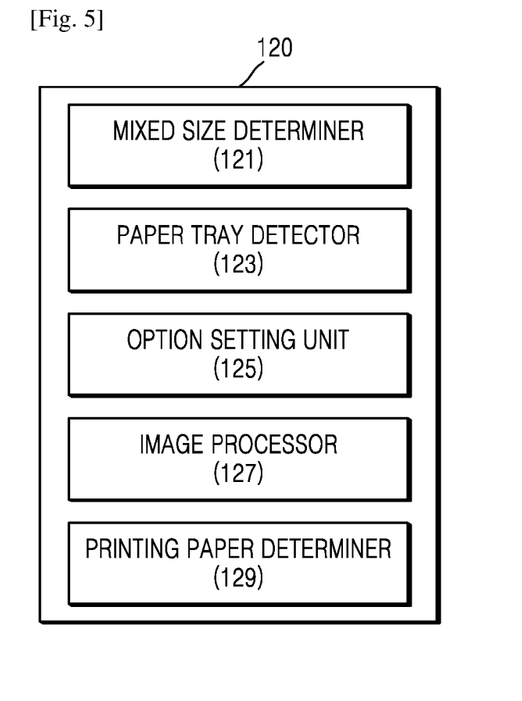
FIG. 5 is a block diagram illustrating a configuration of a processor according to an example.

FIG. 5 is a block diagram illustrating a configuration of a processor according to an example.

Referring to FIG. 5, the processor 120 according to an example may include a mixed size determiner 121, a paper tray detector 123, an option setting unit 125, an image processor 127, and a printing paper determiner 129.

According to an example, the mixed size determiner 121 may determine whether respective sizes of a plurality of images obtained from the outside are identical to one another. When the communication interface 130 obtains print data for one image forming job from the outside, the mixed size determiner 121 may analyze the print data and obtain information regarding respective resolutions of the plurality of images included in one image forming job, the number of horizontal bits and the number of vertical bits of image data, etc. The mixed size determiner 121 may detect the respective sizes of the plurality of images based on information regarding the respective resolutions of the plurality of images included in the one image forming job and the numbers of horizontal and vertical bits of the image data and determine whether the respective sizes of the plurality of images are identical to one another.

According to an example, the paper tray detector 123 may detect whether there is paper in respective paper trays of the image forming apparatus 100 and respective sizes of paper in the paper trays of the image forming apparatus 100.

According to an example, the option setting unit 125 may set output options based on a user input obtained via the user interface 110. The output options may include, but are not limited to, output modes, output methods, and paper selection criteria.

For example, a user may set output options via the user interface 110, such that the output mode is a manual output mode, the output method is a batch output method, and the paper selection criteria is standard paper (e.g., A4 size paper).

According to an example, the image processor 127 may reduce or increase a size of an image. The image processor 127 may calculate a ratio between a size of an image obtained from the outside to a size of paper to output the image and scale the size of the image obtained from the outside according to the calculated ratio.

According to an example, the printing paper determiner 129 may set respective sizes of a plurality of images obtained from the outside. More specifically, the printing paper determiner 129 may set the respective sizes of the plurality of images obtained from the outside, based on a pre-set output mode and pre-set paper selection criteria.

The block diagrams of the image forming apparatuses 100 and 400, the external apparatus 200, and the processor 120 shown in FIGS. 2 through 5 are merely block diagrams according to an example. The components shown in FIGS. 2 through 5 may be integrated with one another, additionally employed, or omitted depending on specifications of an actual device to be implemented. In other words, as occasions demand, two or more components may be combined into one component or one component may be divided into two or more components. Furthermore, operations performed by respective blocks are merely for explanation of examples, and specific operations or devices do not limit the scope of the present disclosure.

Figure 6:
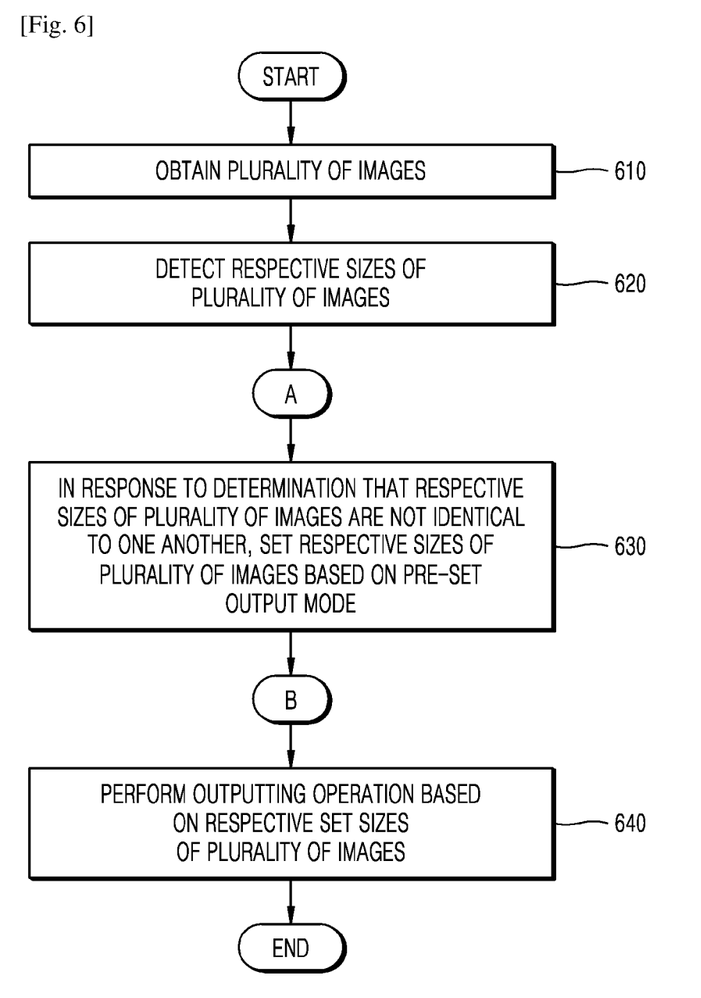
FIG. 6 is a flowchart of a method of operation of an image forming apparatus according to an example.

FIG. 6 is a flowchart of a method of operation of an image forming apparatus according to an example.

Operations of the method shown in FIG. 6 may be performed by the components of the image forming apparatus 100 or 400 shown in FIGS. 2, 3, and 4, and descriptions thereof identical to those given above with reference to FIG. 2 through 4 will be omitted below.

Referring to FIG. 6, the image forming apparatus 100 may obtain a plurality of images in operation 610. As an example, the image forming apparatus 100 may obtain a plurality of images from the external apparatus 200, the server 300, or the like.

In operation 620, the image forming apparatus 100 may detect respective sizes of the plurality of images. As an example, the processor 120 of the image forming apparatus 100 may detect respective sizes of a plurality of images included in one image forming job obtained from the outside.

In operation 630, in response to a determination that the respective sizes of the plurality of images are not identical to one another, the image forming apparatus 100 may set respective sizes of the plurality of images based on a pre-set output mode.

According to an example, the image forming apparatus 100 may pre-set the output mode to an automatic output mode or a manual output mode. The automatic output mode may include an automatic mixed output mode, an automatic batch output mode, or an automatic alternative output mode. In the manual output mode, a user may select an output method via the user interface 110. The output method may include a mixed output method, a batch output method, or an alternative output method.

The terms "automatic mixed output mode" and "mixed output method of manual output mode", "automatic batch output mode" and "batch output method of manual output mode", and "automatic alternative output mode" and "alternative output method of manual output mode" are different from one another only in whether it is automatic or manual and a same method of re-determining sizes of a plurality of images may be employed.

In operation 640, the image forming apparatus 640 may perform an outputting operation based on the respective set sizes of the plurality of images.

Figure 7:
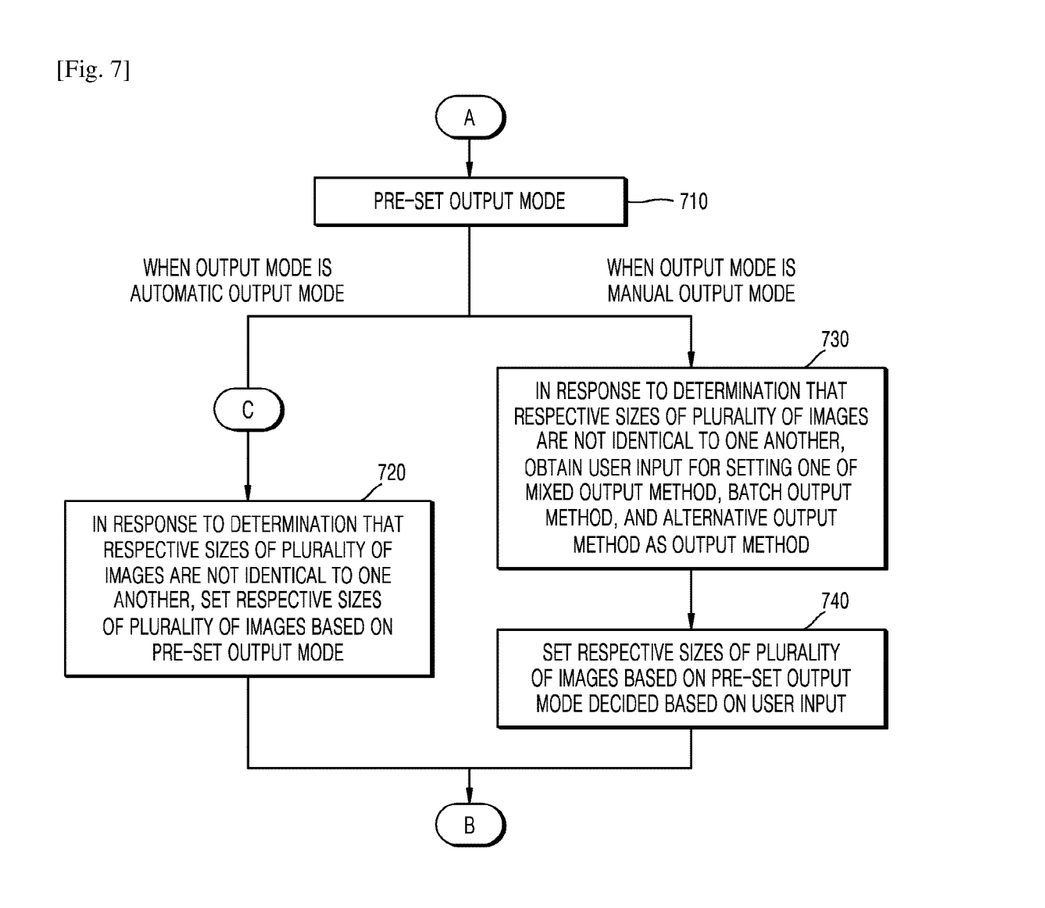
FIG. 7 is a flowchart illustrating a process whereby an image forming apparatus sets respective sizes of a plurality of images according to an example.

FIG. 7 is a flowchart illustrating a process whereby an image forming apparatus sets respective sizes of a plurality of images, according to an example.

Referring to FIG. 7, the image forming apparatus 100 may pre-set an output mode in operation 710.

When the output mode is pre-set to an automatic output mode, the process may proceed to operation 720. When the output mode is pre-set to a manual output mode, the process may proceed to operation 730.

In operation 720, in response to a determination that the respective sizes of the plurality of images are not identical to one another, the image forming apparatus 100 may set respective sizes of the plurality of images based on a pre-set output method.

For example, when the output mode is pre-set to an automatic batch output mode in operation 710 and it is configured to output the plurality of images obtained from the outside to standard size paper regardless of the respective sizes of the plurality of images, the image forming apparatus 100 may set the sizes of all of the plurality of images obtained from the outside to the standard size.

In operation 730, in response to the determination that the respective sizes of the plurality of images are not identical to one another, the image forming apparatus 100 may obtain a user input for determining the output method to one of a mixed output method, a batch output method, and an alternative output mode.

For example, the image forming apparatus 100 may display a user interface screen image that allows a user to select an output method, and the user may refer to the user interface screen image and set the output method to the alternative output mode.

In operation 740, the image forming apparatus 100 may set the respective sizes of the plurality of images based on an output method determined based on the user input.

Figure 8:
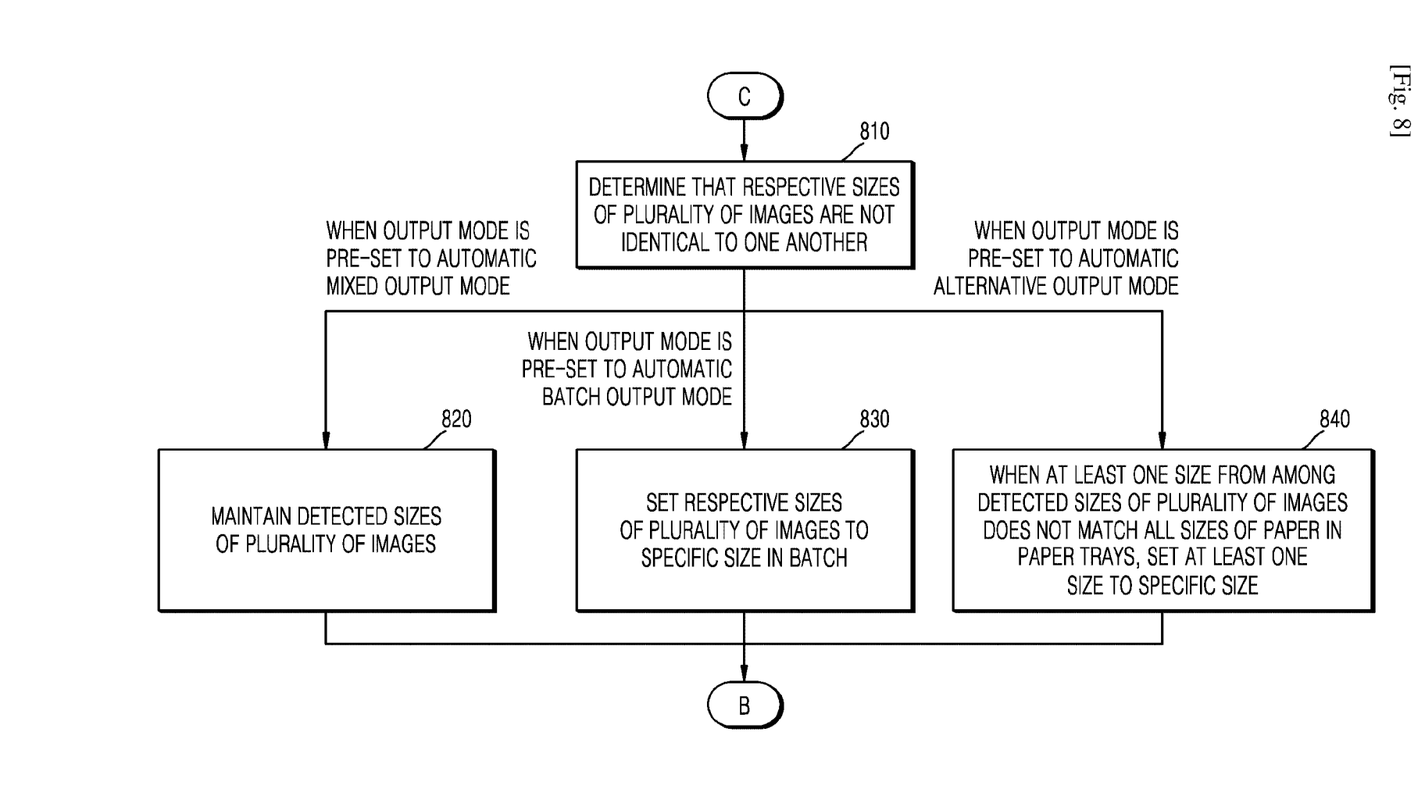
FIG. 8 is a flowchart illustrating a process whereby an image forming apparatus sets respective sizes of a plurality of images in a case where an output mode is an automatic output mode according to an example.

FIG. 8 is a flowchart illustrating a process whereby an image forming apparatus sets respective sizes of a plurality of images in a case where an output mode is an automatic output mode according to an example.

Referring to FIG. 8, the image forming apparatus 100 may determine that the respective sizes of the plurality of images are not identical to one another in operation 810.

When the output mode is pre-set to an automatic mixed output mode, the process may proceed to operation 820. When the output mode is pre-set to an automatic batch output mode, the process may proceed to operation 830. When the output mode is pre-set to an automatic alternative output mode, the process may proceed to operation 840.

In operation 820, the image forming apparatus 100 may maintain the detected sizes of the plurality of images. More specifically, the image forming apparatus 100 may maintain the respective sizes of the plurality of images that are detected while the plurality of images were being obtained from the outside without changing them.

For example, in a case where a plurality of images are obtained from the outside and the respective sizes of the plurality of images are detected as an A3 size, an A4 size, and a B4 size, when the pre-set output mode is the automatic mixed output mode, the image forming apparatus 100 may maintain the detected sizes of the plurality of images, which are the A3 size, the A4 size, and the B4 size, without changing them.

In operation 830, the image forming apparatus 100 may set the respective sizes of the plurality of images to a specific size in a batch. More specifically, the image forming apparatus 100 may set the respective sizes of the plurality of images to a specific size in a batch based on an obtained user input regarding a paper selection criteria.

According to an example, the image forming apparatus 100 may set the respective sizes of the plurality of images to a size (e.g., the largest size, the smallest size, etc.) from among the detected sizes of the plurality of images in a batch.

For example, when a plurality of images are obtained from the outside and respective sizes of the plurality of images are detected as the A3 size, the A4 size, and the B4 size, the image forming apparatus 100 may set the respective sizes of the plurality of images to the A3 size, which is the largest size, or the A4 size, which is the smallest size, from among the detected sizes of the plurality of images in a batch. In another example, the image forming apparatus 100 may set the respective sizes of the plurality of images to the B4 size, which is neither the largest size nor the smallest size.

In operation 840, when at least one of the detected sizes of the plurality of images does not match any of the sizes of paper in a paper tray, the image forming apparatus 100 may set the at least one size to a specific size.

As an example, when at least one of the detected sizes of the plurality of images does not match any of the sizes of paper in a paper tray, the image forming apparatus 100 may set the at least one size that does not match any of the sizes of the paper in the paper tray to a specific size based on an obtained user input regarding paper selection criteria.

For example, when a plurality of images are obtained from the outside and respective sizes of the plurality of images are detected as the A3 size, the A4 size, and the B4 size, if sizes of paper in a paper tray are detected as the A4 size and the B4 size, the image forming apparatus 100 may set the size of an A3 size image, which does not match any of the sizes (i.e., the A4 size or the B4 size) of the paper in the paper tray, to a specific size based on a user input regarding paper selection criteria. For example, when a user has set the image forming apparatus 100 to 'output to an A4 paper when there is no matching paper', the image forming apparatus 100 may set the size of the A3 size image to the A4 size.

According to an example, the image forming apparatus 100 may set at least one size from among detected sizes of a plurality of images that does not match any of the sizes of paper in a paper tray to the largest size from among the sizes of the paper in the paper tray.

As another example, the image forming apparatus 100 may set at least one size from among detected sizes of a plurality of images that does not match any of the sizes of paper in a paper tray to the smallest size from among the sizes of the paper in the paper tray.

For example, when a plurality of images are obtained from the outside and respective sizes of the plurality of images are detected as the A3 size, the A4 size, and the B4 size, if sizes of paper in a paper tray are detected as the A3 size and the A4 size, the image forming apparatus 100 may set the size of B4 size images obtained from the outside to the A3 size, which is the largest size from among the sizes of the paper in the paper tray. Alternatively, the image forming apparatus 100 may set the size of B4 size images obtained from the outside to the A4 size, which is the smallest size from among the sizes of the paper in the paper tray.

Figure 9:
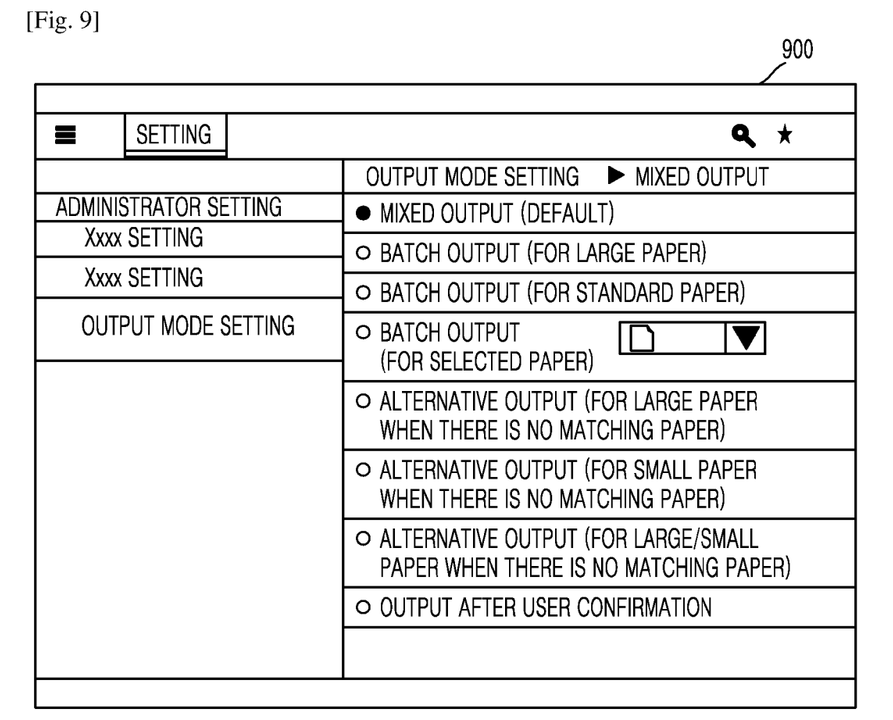
FIG. 9 is a diagram illustrating a user interface screen image for setting an output mode according to an example.

FIG. 9 is a diagram illustrating a user interface screen image for setting an output mode according to an example.

Referring to FIG. 9, the image forming apparatus 100 may obtain an input from a user via a user interface screen image 900 and set an output mode in advance.

According to an example, output modes of the image forming apparatus 100 may be roughly classified into an automatic output mode and a manual output mode (for example a user confirmation mode), and more specifically, to an automatic mixed output mode, an automatic batch output mode, an automatic alternative output mode, and a manual output mode. Furthermore, output modes of the image forming apparatus 100 may be further classified into an automatic mixed output mode, an automatic batch output mode (for large paper), an automatic batch output mode (for standard paper), an automatic batch output mode (for selected paper), an automatic alternative output mode (for large paper when there is no matching paper), an automatic alternative output mode (for small paper when there is no matching paper), an automatic alternative output mode (for large paper or small paper when there is no matching paper), and a manual output mode.

According to an example, the automatic batch output mode may include three sub-items for outputting to large paper in a batch, for outputting to standard paper in a batch, and for outputting to selected paper in a batch. More specifically, the image forming apparatus 100 may uniformly set sizes of a plurality of images to the largest size from among the sizes of the images, to one of standard paper sizes, or to a user-selected size in a batch.

According to an example, the automatic alternative output mode may include three sub-items for alternatively outputting to large paper, for alternatively output to small paper, and for alternative outputting to large paper or small paper.

A user may see a user interface screen image 900 and select one of output modes by providing a touch input, a mouse input, a keyboard input, or the like via the user interface screen image 900, but types of inputs are not limited thereto.

Figure 10:
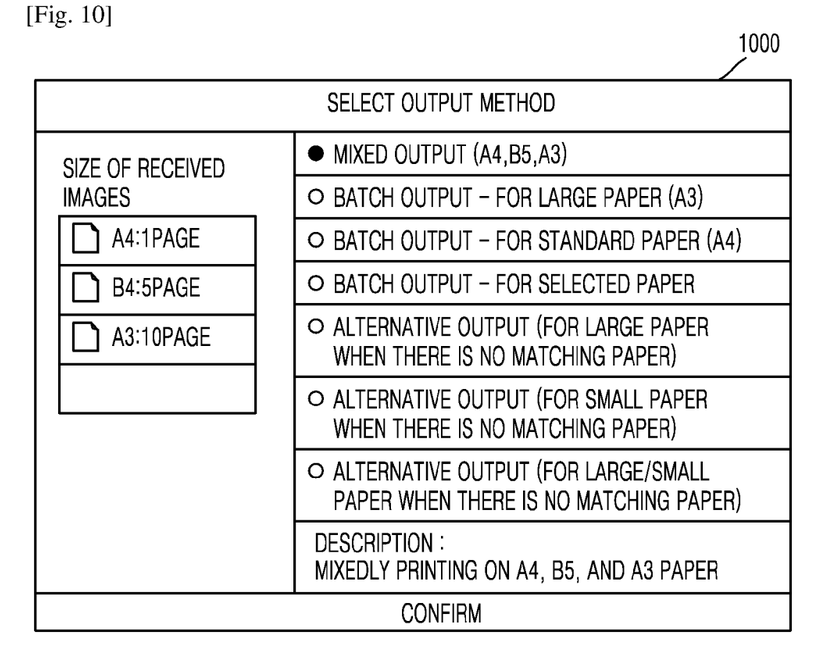
FIG. 10 is a diagram illustrating a user interface screen image for setting an output method in a manual output mode according to an example.

FIG. 10 is a diagram illustrating a user interface screen image for setting an output method in a manual output mode according to an example.

According to an example, when the manual output mode (i.e., output after a user confirmation) is selected in the user interface screen image 900 shown in FIG. 9, in response to a determination that respective sizes of a plurality of images obtained from the outside are not identical to one another, a user interface screen image 1000 shown in FIG. 10 may be displayed.

Referring to FIG. 10 as an example, the image forming apparatus 100 may display sizes of images obtained by the image forming apparatus 100 in a user interface screen image 1000. A user may select one of a mixed output method, a batch output method, and an alternative output method as an output method by referring to the sizes of the images. More specifically, the user may select the output method from among a mixed output mode, a batch output mode (for large paper), a batch output mode (for standard paper), a batch output mode (for selected paper), an alternative output mode (for large paper when there is no matching paper), an alternative output mode (for small paper when there is no matching paper), and an alternative output mode (for large paper or small paper when there is no matching paper).

In a manual output mode according to an example, the image forming apparatus 100 may set the respective sizes of the plurality of images based on the output method selected by the user.

Figure 11:
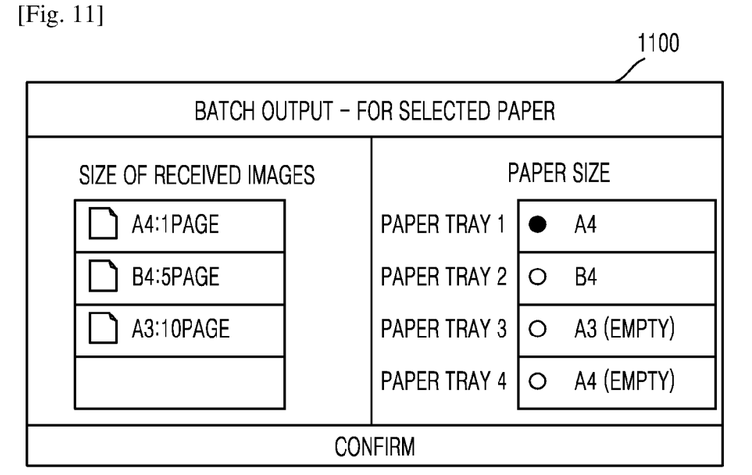
FIG. 11 is a diagram illustrating a user interface screen image regarding an example of a batch output method according to an example.

FIG. 11 is a diagram illustrating a user interface screen image regarding an example of a batch output method according to an example.

Referring to FIG. 11, when the batch output method (for selected paper) is selected in the user interface screen image 1000 shown in FIG. 10, a user interface screen image 1100, as an example, may be displayed.

According to an example, as shown in FIG. 11, the image forming apparatus 100 may display sizes of images obtained by the image forming apparatus 100 in the user interface screen image 1100. The user may select a size of paper to perform batch output by referring to the sizes of the images.

As an example, when the user selects the A4 size as shown in the user interface screen image 1100 of FIG. 11, the obtained images may be output to A4 size paper regardless of the sizes of the obtained images. Alternatively, when the user selects the B4 size, the obtained images may be output to the B4 size paper regardless of the sizes of the obtained images.

Figure 12:
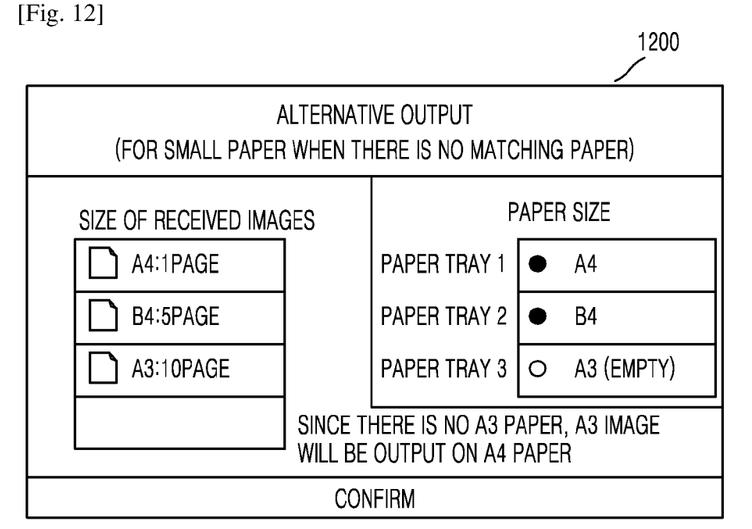
FIG. 12 is a diagram illustrating a user interface screen image regarding an example of an alternative output method according to an example.

FIG. 12 is a diagram illustrating a user interface screen image regarding an example of an alternative output method according to an example.

Referring to FIG. 12, when the alternative output method (for small paper when there is no matching paper) is selected in the user interface screen image 1000 shown in FIG. 10 as an example, a user interface screen image 1200 may be displayed.

According to an example, as shown in FIG. 12, the image forming apparatus 100 may display sizes of images obtained by the image forming apparatus 100 in the user interface screen image 1200. According to the user interface screen image 1200 shown in FIG. 12, the image forming apparatus 100 obtained an A4 size image, a B4 size image, and an A3 size image. However, because there are only A4 size paper and B4 size paper in paper trays, the obtained A3 size image may be output to paper of another size according to the alternative output method. According to a rule for outputting to a small paper when there is no matching paper, the obtained A3 size image may be output to an A4 size paper or a B4 size paper.

In the example shown in FIG. 12, it may be either selected by the user or automatically selected according to a pre-set rule whether to output the obtained A3 size image to an A4 size paper or a B4 size paper. For example, when there is no A3 size paper, it may be automatically determined to output on an A4 paper, which is one size smaller than an A3 paper according to the A paper standard. However, examples of a case where size of paper to output is automatically determined according to a pre-set rule are not limited thereto.

It should be understood that examples described herein should be considered in a descriptive sense only and not for purposes of limitation. Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope of the inventive concept as defined by the following claims.

Example of the present disclosure can also be embodied as computer readable code on a non-transitory computer readable recording medium. A non-transitory computer readable recording medium may be any data storage device that can store data, which can be thereafter read by a computer system. Examples of the non-transitory computer readable recording medium include read-only memory (ROM), random-access memory (RAM), CD-ROMs, magnetic tapes, floppy disks, and optical data storage devices. The non-transitory computer readable recording medium can also be distributed over network coupled computer systems so that the computer readable code is stored and executed in a distributed fashion.

The invention claimed is:

1. An image forming apparatus to output a plurality of images, the image forming apparatus comprising:
   a communication interface to receive a print command including a plurality of images;
   a processor to:
      detect respective sizes of the plurality of images,
      determine that a size of a first image of the plurality of images is not identical to another of the respective sizes of the plurality of images,
      in response to the determination that the size of the first image of the plurality of images is not identical to another of the respective sizes of the plurality of images, determine an output mode of the image forming apparatus,
      in response to the output mode being an automatic output mode, set the respective sizes of the plurality of images based on a pre-set output method including reducing or increasing the size of the first image, and in response to the output mode being a manual output mode, obtain a user selection of an output method and set the respective sizes of the plurality of images based on the user selected output method including reducing or increasing the size of the first image; and an image forming job performer to perform an outputting operation based on the respective set sizes of the plurality of images.

2. The image forming apparatus of claim 1, wherein, when the pre-set output method is an automatic batch output method, the processor sets the respective sizes of the plurality of images to a specific size in a batch.

3. The image forming apparatus of claim 2, wherein the processor sets the respective sizes of the plurality of images to a largest size or a smallest size from among the detected sizes of the plurality of images in the batch.

4. The image forming apparatus of claim 1, wherein, when the pre-set output method is an automatic alternative output method, the processor:
   detects sizes of paper in paper trays of the image forming apparatus,
   compares the respective sizes of the plurality of images to the sizes of the paper in the paper trays, and
   when a size from among the detected sizes of the plurality of images does not match any size of the paper in the paper trays, sets the size to a specific size.

5. The image forming apparatus of claim 4, wherein the processor sets the size to a largest size from among the sizes of the paper in the paper trays.

6. The image forming apparatus of claim 4, wherein the processor sets the size to a smallest size from among the sizes of the paper in the paper trays.

7. The image forming apparatus of claim 1, wherein, when the output mode is the manual output mode, in response to the determination that the size of the first image of the plurality of images is not identical to another of the respective sizes of the plurality of images, the processor:
   obtains the user selection of one of a mixed output method, a batch output method, or an alternative output method via a user interface, and
   sets the respective sizes of the plurality of images based on the output method obtained from the user selection.

8. A method of outputting a plurality of images, the method comprising:
   receiving a print command including a plurality of images;
   detecting respective sizes of the plurality of images;
   determining that a size of a first image of the plurality of images is not identical to another of the respective sizes of the plurality of images;
   in response to the determination that the size of the first image of the plurality of images is not identical to another of the respective sizes of the plurality of images, determining an output mode of the image forming apparatus;
   in response to the output mode being an automatic output mode, setting the respective sizes of the plurality of images based on a pre-set output method including reducing or increasing the size of the first image;
   in response to the output mode being a manual output mode, obtaining a user selection of an output method and setting the respective sizes of the plurality of images based on the user selected output method including reducing or increasing the size of the first image; and
   performing an outputting operation based on the respective set sizes of the plurality of images.

9. The method of claim 8, wherein the setting of the respective sizes of the plurality of images comprises, when the pre-set output method is an automatic batch output method, setting the respective sizes of the plurality of images to a specific size in a batch.

10. The method of claim 9, wherein the specific size is a largest size or a smallest size from among the detected sizes of the plurality of images.

11. The method of claim 8, wherein the setting of the respective sizes of the plurality of images comprises:
    when the is pre-set output method is an automatic alternative output method, detecting sizes of paper in paper trays of an image forming apparatus;
    comparing the respective sizes of the plurality of images to the sizes of the paper in the paper trays; and
    when a size from among the detected sizes of the plurality of images does not match any size of the paper in the paper trays, setting the size to a specific size.

12. The method of claim 11, wherein the specific size is a largest size from among the sizes of the paper in the paper trays.

13. The method of claim 11, wherein the specific size is a smallest size from among the sizes of the paper in the paper trays.

14. The method of claim 8, wherein the setting of the respective sizes of the plurality of images comprises:
    when the output mode is the manual output mode, in response to the determination that the size of the first image of the plurality of images is not identical to another of the respective sizes of the plurality of images, obtaining the user selection of one of a mixed output method, a batch output method, and an alternative output method; and
    setting the respective sizes of the plurality of images based on the output method obtained from the user selection.

15. A non-transitory computer readable recording medium having recorded thereon instructions, executable by a processor, for implementing a method of outputting a plurality of images on a computer, the computer readable recording medium comprising:
    instructions to receive a print command including a plurality of images;
    instructions to detect respective sizes of the plurality of images;
    instructions to determine that a size of a first image of the plurality of images is not identical to another of the respective sizes of the plurality of images;
    instructions to, in response to the determination that the size of the first image of the plurality of images is not identical to another of the respective sizes of the plurality of images, determine an output mode;
    instructions to, in response to the output mode being an automatic output mode, set the respective sizes of the plurality of images based on a pre-set output mode method including reducing or increasing the size of the first image;
    instructions to, in response to the output mode being a manual output mode, obtain a user selection of an output method and set the respective sizes of the plurality of images based on the user selected output method including reducing or increasing the size of the first image; and
    instructions to perform an outputting operation based on the respective set sizes of the plurality of images.

* * * * *